United States Patent [19]

Eckardt et al.

[11] Patent Number: 4,768,375

[45] Date of Patent: Sep. 6, 1988

[54] PRESSURE SENSOR

[75] Inventors: Dieter Eckardt, Nuremburg; Gerhard Hettich, Rosstal; Kurt Metzger, Oberasbach; Sonja Polster; Hans-Dieter Schmid, both of Nuremburg; Hans-Jörg Schmidt, Feucht; Hans Schrumpf, Oberasbach, all of Fed. Rep. of Germany

[73] Assignee: Robert Bosch GmbH, Stuttgart, Fed. Rep. of Germany

[21] Appl. No.: 32,340

[22] PCT Filed: May 20, 1986

[86] PCT No.: PCT/DE86/00211

§ 371 Date: Mar. 3, 1987

§ 102(e) Date: Mar. 3, 1987

[87] PCT Pub. No.: WO87/00128

PCT Pub. Date: Jan. 15, 1987

[30] Foreign Application Priority Data

Jul. 3, 1986 [DE] Fed. Rep. of Germany ....... 3523774

[51] Int. Cl.⁴ .......................... B60C 73/04; G01L 7/08; G01L 9/04

[52] U.S. Cl. .................................... 73/146.5; 73/720; 338/4; 340/58

[58] Field of Search .................... 73/146.4, 146.2, 720, 73/721, 722, 726, 727, 728 DIG. 4; 340/58; 338/4

[56] References Cited

U.S. PATENT DOCUMENTS

| 4,085,620 | 8/1984 | Tanaka  | 73/727 |
| 4,467,641 | 8/1984 | Abraham | 340/58 |
| 4,562,874 | 1/1986 | Scheller | 73/146.5 |

Primary Examiner—Donald O. Woodiel
Attorney, Agent, or Firm—Walter Otteson

[57] ABSTRACT

In a pressure sensor for detecting the air pressure in the interior of tubeless tires of motor vehicles, on a rim having two edge beads extending around its outside and a drum-like base, to facilitate mounting and provide malfunction-free, exact detection of pressure it is provided that the pressure sensor (10) is disposed in a bore (9) of the preferably radially inner section (5) of a bead (3), and in particular the longitudinal axis (43) of the pressure sensor (10) forms an acute angle with the axis (44) of the rim.

13 Claims, 3 Drawing Sheets

PRESSURE SENSOR

FIELD OF THE INVENTION

The invention is directed to a pressure sensor for detecting the air pressure of a tubeless tire mounted on the rim of a wheel of a motor vehicle.

BACKGROUND OF THE INVENTION

A pressure sensor of this type is used to detect the air pressure in the interior of so-called tubeless tires in motor vehicles. The air pressure in such tires is highly important for both vehicle road holding quality and tire life. In the context of the measurement of important vehicle data, it would appear desirable for this tire pressure also to be detected and monitored as accurately as possible.

The problem in obtaining these measured values is that during vehicle operation, as when the tires are mounted or removed, tires undergo considerable mechanical strain, which can cause sensor damage, particularly with sensitive sensors, which are inherently desirable. There is also the problem that the centrifugal forces involved can falsify the measurements made by the pressure sensors.

From U.S. Pat. No. 4,237,728, an apparatus is known which enables an indirect, rough ascertainment of the tire pressure by means of an elastically deformable feeler protruding radially outward from the drum-like central rim portion; the feeler is deflected whenever the tire cross section varies, for instance, when because of a pressure drop, the inside wall of the tire comes to rest on the feeler. The feeler is connected to a piezoelectric crystal, and the resultant compression of the piezoelectric crystal generates a voltage, from which the measurement signal is derived. This previously known measuring system is accordingly relatively insensitive and is substantially suitable only for detecting highly abnormal conditions. Because of the insensitivity of the feeler provided in the prior art, falsification of the measured results is less serious.

SUMMARY OF THE INVENTION

Starting from the above, the object of the invention is to provide a pressure sensor of the above type such that simple and operationally reliable mounting of the entire pressure sensor on the rim is made possible; the individual sensor elements of the pressure sensor should be disposed therein in a strain-free manner, protected from damage, and subjected to the pressure and temperature of the air in the tires.

The fastening technique provided by the invention enables absolutely pressure-tight installation, even with high centrifugal forces, and enables mounting in the rim from the outside with only slight protrusions inside the tire, as well as enabling a mechanically sturdy embodiment.

An advantage of the pressure sensor of the invention is that a falsification of measured values by centrifugal force is largely precluded, and furthermore, shocks or other mechanical strains at right angles to the pressure-sensitive surfaces of the pressure sensor are avoided.

Another advantage of the pressure sensor of the invention is that it is particularly simple to mount the sensor in the rim from outside, as desired. No sensitive fastening parts of any kind come to rest on the inside of the rim, that is, toward the inside of the tire, and so even when the tire is mounted or removed, damage to the retaining and fixation devices of the pressure sensor by the machines and tools used for this purpose need not be feared.

A sealing ring for sealing off the interior of the tire with respect to the ambient assures hermetic sealing, so that pressure losses due to the inserted pressure sensor need not be feared.

Still another advantage of the pressure sensor of the invention is that on the one hand it makes mutually independent pressure measurements by independent sensor elements possible, which substantially increases the operational reliability. On the other hand, because the sensor elements are disposed in a region completely free of fastening strains, such strains are precluded from impairing the measurements.

A particularly strain-free fastening of the substrate of the sensor elements is attained by potting, because the epoxy resin, for example, used for this purpose hardens largely without generating strains and because it is adapted to the substrate in terms of its temperature-dependent expansion. This fastening technique thus offers considerable advantages over mechanical fastenings such as screws or clamps, yet comparably great strength is attained.

The connecting line is guided so that it is well protected from mechanical strains and electrical interference in the interior of the housing.

A protective jacket in the form of a protective conduit extends the protection provided by the housing beyond the housing. The connection between the housing and the protective conduit is advantageously effected by a weld.

The soldering eyes formed by the bores in the substrate enable simple and firm holding of the connection conductors and their bonding to the conductor tracks formed on the substrate.

The potting assures great mechanical strength as well as good electrical insultion, and the construction becomes particularly simple in a combination in which the substrate is fastened to the housing.

When the sensor elements are disposed on the back of the substrate, possible centrifugal forces do not pull them away from the substrate but instead press the sensors thereagainst. The sensor elements are kept at the temperature of the air in the tires, because of the good thermal conduction of the substrate.

A gel, for instance silicone gel, protects the sensor elements and the bonded connections. Because of the embodiment according to the invention, the gel is reliably held in the appropriate recess by the substrate, even when centrifugal force is high, and the component of the centrifugal force that acts in the axial direction of the pressure sensor presses the gel against the substrate.

A protective covering protects the sensitive sensor elements from mechanical damage and at the same time, because of the openings, enables pressure and temperature equalization, so that the measured values are not impaired.

Further characteristics, advantages and details of the invention will become apparent from the ensuing description of a preferred exemplary embodiment, taken in conjunction with the drawing.

DESCRIPTION OF THE PREFERRED EMBODIMENTS OF THE INVENTION

Figure 1:
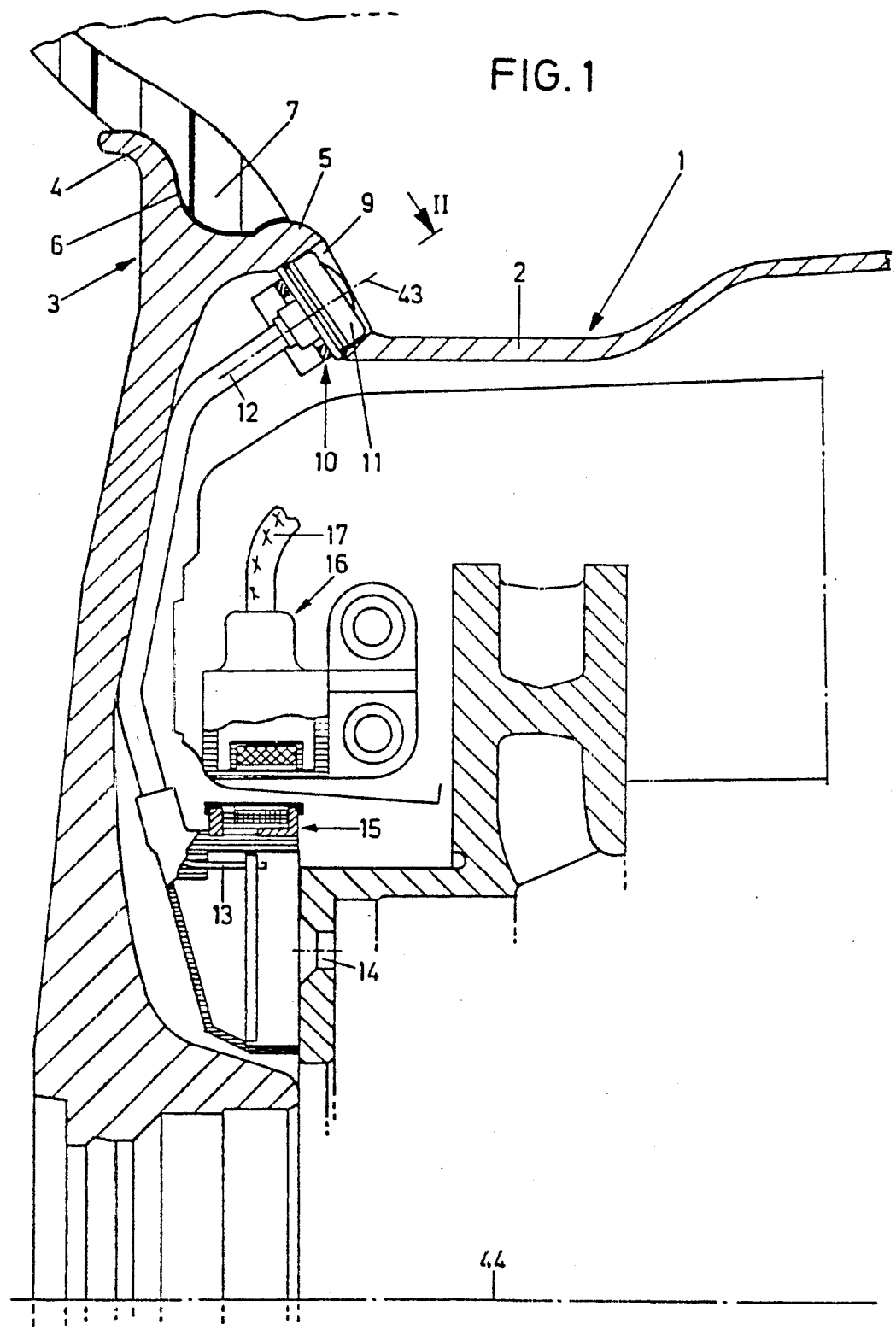
FIG. 1 shows a section through a rim having a pressure sensor according to the invention.

In FIG. 1, a rim 1 is shown in fragmentary form, having a drum-like base 2 adjoined toward each of the outer edges by a continuous bead 3 (only one of which is shown in FIG. 1).

Each bead 3 includes a radially outer first section 4 and a radially inner second section 5. The wall 7 of a tire 8, shown only in part, rests against the inside 6 of the radially outer section 4.

The radially farther inward section 5 of the bead 3 is provided with a bore 9 for receiving the pressure sensor 10.

A conventional connection line opens into the housing 11 of the pressure sensor 10. This connection line comprises a high-grade steel tube 12, in which a plurality of connection conductors 13 are guided, separately from one another, in an insulating mass; these conductors connect the pressure sensor 10 to a data transmission unit 15, which is shown only schematically and is joined to the rim by means of a screw 14. Associated with this data transmission unit 15 is a stationary data receiving unit 16 on the side facing toward the vehicle; via a schematically represented line 17, the measured electrical values emitted by the pressure sensor 10 are carried by the data receiving unit 16 to a central processing and display unit. This data transmission can be accomplished by techniques known per se. One possibility for this is described, for example, in U.S. Pat. No. 4,237,738, which was mentioned above.

Figure 2:
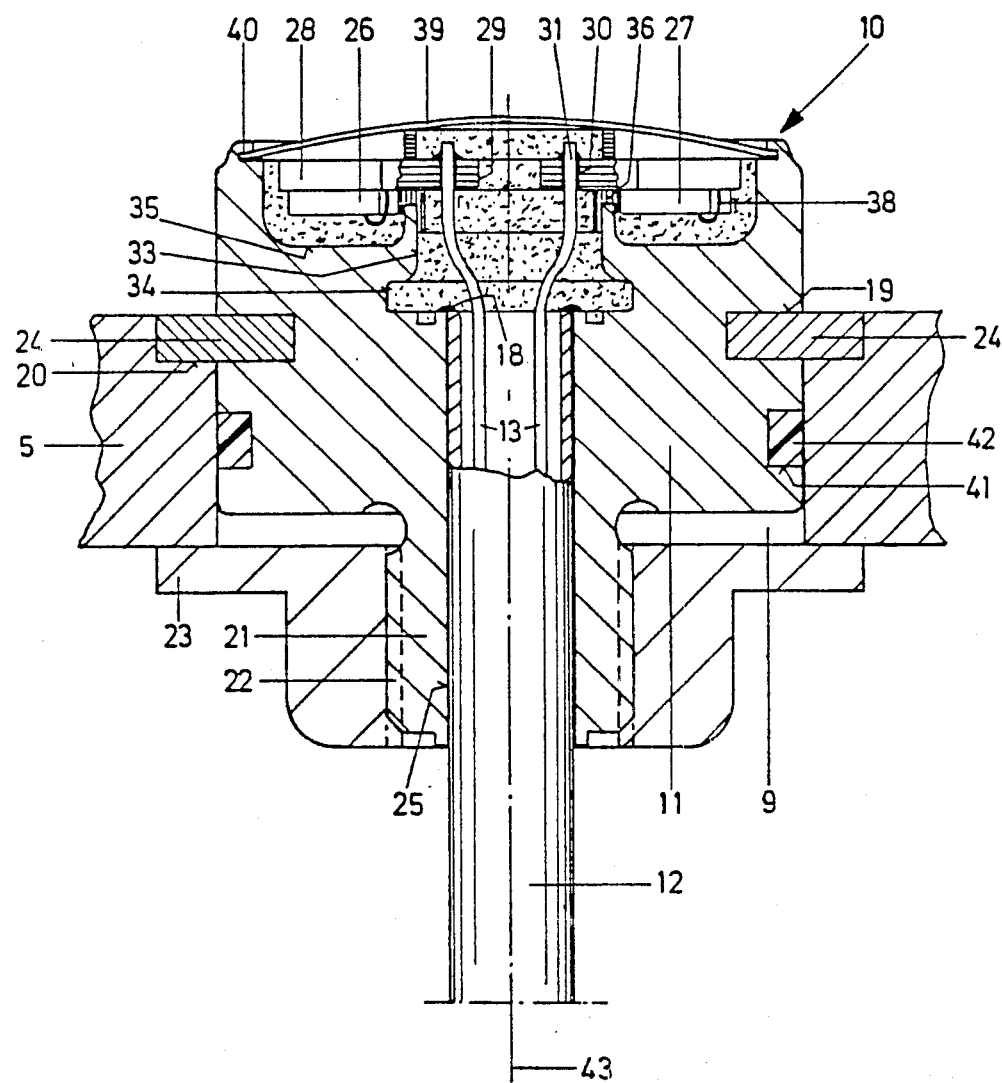
FIG. 2 shows a section through the pressure sensor in the direction of the arrow II in FIG. 1.

The pressure sensor 10, shown only schematically in FIG. 1, is shown in detail in FIG. 2. This figure particularly shows that the high-grade steel tube 12 is laser-welded at its upper end to the high-grade steel housing 11, by means of the weld seam 18.

The housing 11 has a continuous annular groove 19 on the outside thereof. In assembly, the housing 11 is inserted from outside through the bore 9 in the section 5 of the rim 1, whereupon annular half-discs 24 are inserted from both sides into the annular groove 19; these discs are radially secured toward the outisde by a blind bore 20 in the section 5 and come to rest in this bore such that the top is flush with the outer face of the rim section 5.

In the region of the other bore opening of the bore 9, the housing 11 has a threaded extension 21 having an external thread 22. A tensioning nut 23 is screwed onto this threaded extension with an internal thread corresponding to the external thread 22, the tensioning nut 23 extending outwardly beyond the bore 9 and in this manner braces the housing 11 in the bore 9 via the annular half-discs 24.

The threaded extension 21 and the housing 11 are integrally embodied and are provided with a longitudinal bore 25 the inside of which is engaged by the tube 12.

The pressure sensor 10 according to the invention includes two pressure-sensitive sensor elements 26, 27 which are fastened in the region of the outer edge of a ceramic substrate 28 that carries them. These sensor elements 26, 27 are a known kind of semiconductor pressure sensor (see, for example, the journal "Regelungstechnische Praxis" 1982, No. 7, page 223) which utilizes the piezoelectric resistance for pressure signal formation. Each sensor element 26, 27 thus furnishes its own pressure value signal.

The ceramic substrate 28 has good thermal conduction and has a central bore 29. Furthermore, a plurality of bores 30 of lesser diameter are also provided in the central region, surrounding the central bore 29. The ends 31 of the conductors 13 are received in these bores 30 and soldered to conductor tracks 32 surrounding the bores 30 and effecting connection to the terminals of the sensor elements 26, 27.

For fastening the substrate 28 in the housing and for mechanical and electrical protection of the contacts (conductor tracks 32 or conductor ends 31), a central recess 33 of the housing, facing the interior of the tire and having an undercut 34, is potted with epoxy resin, the substrate 28 being seated on the recess 33 with a ring 36 of insulating material on the housing 11. During the potting, the epoxy resin also penetrates the central bore 29 of the substrate and covers its upper side. At the same time, the potting compound, which has poor thermal conductivity, gets behind the undercut 34. This means that the substrate and the housing are well insulated from one another thermally, yet are firmly joined together in both the radial and axial directions, without thereby transmitting strains to the substrate.

The sensors 26, 27 are disposed on the back, that is, on the side of the substrate 28 remote from the tire interior. In the region underneath the sensors 26, 27, the housing has an annular recess 35, which is filled with silicone gel, which protects both the sensors 26, 27 and the bonded-on terminals 38, yet at the same time enables the transmission of pressure.

The upper side of the substrate 28 is protected by a covering cap 39, which is fastened by a flanged-over part 40 at the face end and has openings, not shown in detail, which are dimensioned such as to enable pressure equalization.

The housing wall region of the pressure sensor 10, which comes to rest in the bore 9, has an annular groove 41 for a sealing ring 42, and as a result a hermetic seal is attained between the exterior and interior of the tire.

By means of the disposition according to the invention, it is attained that the longitudinal axis 43 of the sensor forms an acute angle with the axis 44 of the rim. In other words, this means that the pressure-sensitive surfaces of the sensor are located virtually at right angles to the axis 44 of the rim, or are almost in the plane of the wheel. Accordingly, the pressure measurement by the pressure sensor 10 or by the sensor elements is virtually unaffected by centrifugal force. By disposing the sensor elements on the back of the substrate 28, the gel 37 is not pulled away by any centrifugal force components that might be acting in the longitudinal axis of the pressure sensor 10 but is pressed there-against instead. Measurements have demonstrated that measurement errors resulting from this are smaller than in the case where the sensor elements 26, 27 are disposed on the front of the substrate 28.

Figure 3:
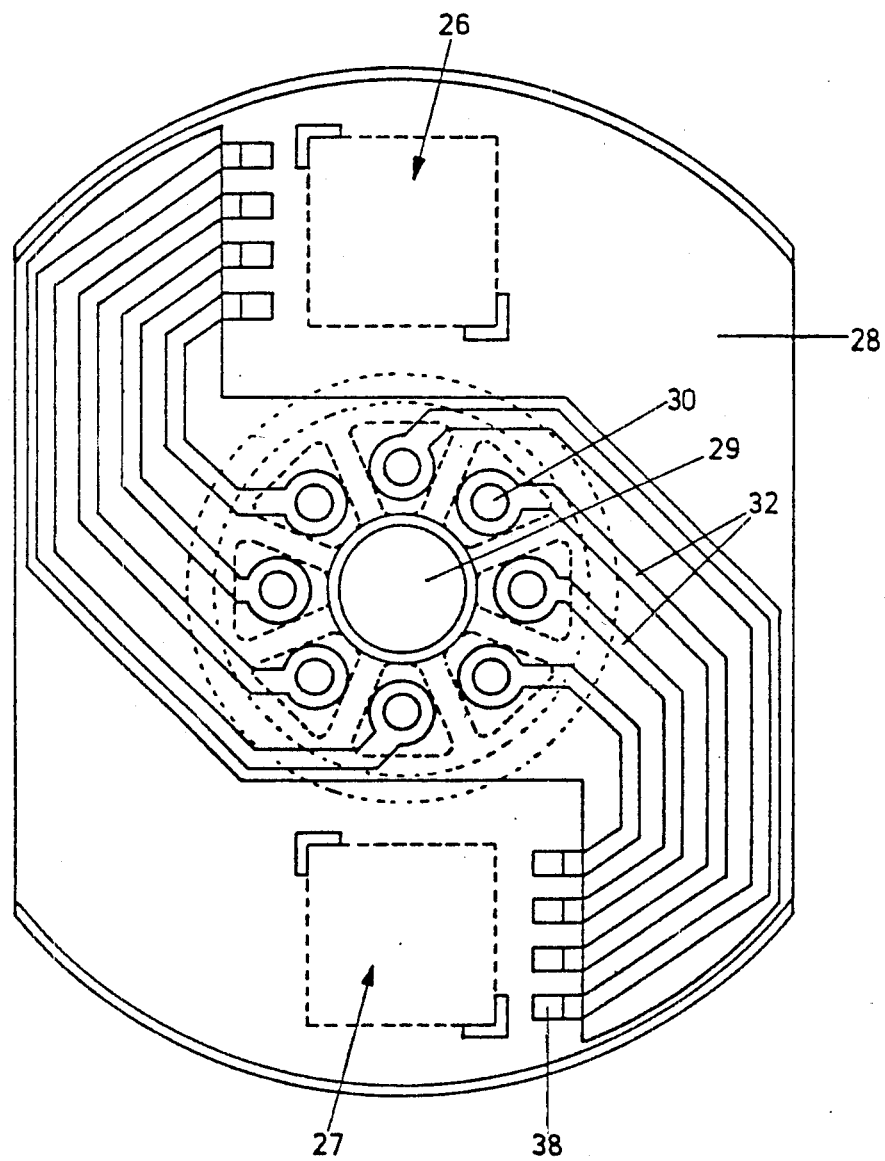
FIG. 3 shows a plan view on the substrate with sensor elements and conductor tracks.

The shape of the plate-like substrate 28 shown in FIG. 3 must be selected such that the compressed air in the tire can move laterally past the substrate 28 to reach the sensor elements 26, 27 disposed on the back. The air pressure to be measured is transmitted by the gel 37 that covers the sensor elements.

The structure of the pressure sensor 10 is embodied such that in principle it can be mounted in a bore 9 located at any arbitrary point on the rim 1. Since the mass of the sensor elements 26, 27 is very slight, the centrifugal force it exerts on the sensor elements is also very slight and causes only insignificant measurement errors. Disposing the pressure sensor 10 in a radial section of the rim 1, however, assures that the centrifugal force acting upon the gel 37 covering the sensor elements 26, 27 also causes no measurement errors, or only negligible ones.

We claim:

1. A pressure sensor arrangement for detecting the air pressure of a tubeless tire mounted on the rim of a wheel of a motor vehicle, the rim having a drum-like base bounded by two rim flanges, each of the rim flanges having a radial outer portion on which the radial inner edge of the tire is seated and a radial or approximately radial inner portion adjacent said base, said radial inner portion and said base both being exposed to the interior of the tire, the pressure sensor arrangement comprising:

bore means formed in one of said radial inner portions so as to communicate with the interior of the tire;
a sensor unit including a housing fixedly mounted in said bore means;
said housing having a recess formed therein so as to face into the interior of said tire;
a substrate seated in said recess and having a central bore formed therein;
fixing means for extending through said bore and into said housing for attaching said substrate thereto; and,
at least one pressure sensor mounted on the outer region of said substrate.

2. The pressure sensor arrangement of claim 1, said fixing means being a castable material extending through said bore and into said housing for attaching said substrate thereto.

3. The pressure sensor arrangement of claim 2, said housing having a base body with a central conduit bore formed therein; and, said pressure sensor arrangement further comprising a connecting line including: a protective conduit seated in said conduit bore; and, connecting leads connected to said substrate and being arranged in said conduit bore.

4. The pressure sensor arrangement of claim 3, said base body and said protective conduit both being made of stainless steel; and, weld means for welding said protective conduit and said base body to each other.

5. The pressure sensor arrangement of claim 3, said substrate having a central region in surrounding relationship to said central bore and having a plurality of lead bores formed therein and located in said central region; and, said connecting leads having respective lead ends accommodated in said lead bores.

6. The pressure sensor arrangement of claim 5, said substrate having a plurality of conductive paths formed thereon and connected to selected ones of said lead ends; and, said sensor having a plurality of terminals bonded to selected ones of said conductive paths.

7. The pressure sensor arrangement of claim 6, said castable means being placed so as to cause said central bore and said connecting leads to be embedded therein so as to insulate said connecting leads with respect to said housing.

8. The pressure sensor arrangement of claim 7, said recess being formed in said base body and having a central portion communicating with said conduit bore, said central portion including a cutback extending into said base body; and, said castable means extending down into and filling out said central portion including said cutback to anchor said substrate to said base body.

9. The pressure sensor arrangement of claim 8, said substrate having a first surface facing toward the interior of the tire and a second surface facing away from said interior, said sensor being mounted on said second surface of said substrate.

10. The pressure sensor arrangement of claim 9, said recess including a peripheral portion cut out of said base body so as to be adjacent said central portion and beneath said sensor; and, a gel filling out said peripheral portion for transmitting the pressure of the air in the tire to said sensor.

11. A pressure sensor arrangement for detecting the air pressure of a tubeless tire mounted on the rim of a wheel of a motor vehicle, the rim having a drum-like base bounded by two rim flanges, each of the rim flanges having a radial outer portion on which the radial inner edge of the tire is seated and a radial or approximately radial inner portion adjacent said base, said radial inner portion and said base both being exposed to the interior of the tire, the pressure sensor arrangement comprising:

bore means formed in one of said radial inner portions so as to communicate with the interior of the tire;
a sensor unit including a housing fixedly mounted in said bore means;
said housing having a recess formed therein so as to face into the interior of said tire;
a substrate seated in said recess;
at least one pressure sensor mounted on the outer region of said substrate; and,
said housing including: a base body and said recess being formed in said base body; and, a cover seated on said base body and having apertures formed therein for permitting the pressure of the air in the tire to act upon said pressure sensor.

12. A pressure sensor arrangement for detecting the air pressure of a tubeless tire mounted on the rim of a wheel of a motor vehicle, the rim having a drum-like base bounded by two rim flanges, each of the rim flanges having a radial outer portion on which the radial inner edge of the tire is seated and a radial or approximately radial inner portion adjacent said base, said radial inner portion and said base both being exposed to the interior of the tire, the pressure sensor arrangement comprising:

bore means formed in one of said radial inner portions so as to communicate with the interior of the tire;
a sensor unit including a housing fixedly mounted in said bore means;
said housing having a recess formed therein so as to face into the interior of said tire;
a substrate seated in said recess; and,
said housing having a thread formed thereon at one end thereof and having an annular slot formed therein and spaced from said thread; two split rings insertable into said slot so as to have an outer portion extending outwardly beyond said housing to engage one surface of said one radial inner portion at one end of said bore means; said housing further including a threaded nut placeable over said housing for engaging said thread on said housing and for engaging the other surface of said inner radial portion so as to clamp said housing onto said one radial inner portion of said rim.

13. A pressure sensor arrangement for detecting the air pressure of a tubeless tire mounted on the rim of a wheel of a motor vehicle, the rim having a drum-like base bounded by two rim flanges, each of the rim flanges having a radial outer portion on which the radial inner edge of the tire is seated and a radial or approximately radial inner portion adjacent said base, said radial inner portion and said base both being exposed to the interior of the tire, the pressure sensor arrangement comprising:

bore means formed in one of said radial inner portions so as to communicate with the interior of the tire;

a sensor unit including a housing fixedly mounted in said bore means;

said housing having a recess formed therein so as to face into the interior of said tire;

a substrate seated in said recess;

at least one pressure sensor mounted on the outer region of said substrate; and, said housing having a cylindrical portion adjacent the inner wall of said bore means, said cylindrical portion having a slot formed therein and said housing including a sealing ring seated in said slot for sealing off the interior of the tire with respect to the ambient.

* * * * *